(No Model.)
E. B. PRESTON.
FIRE LADDER TRUCK.
No. 411,929. Patented Oct. 1, 1889.
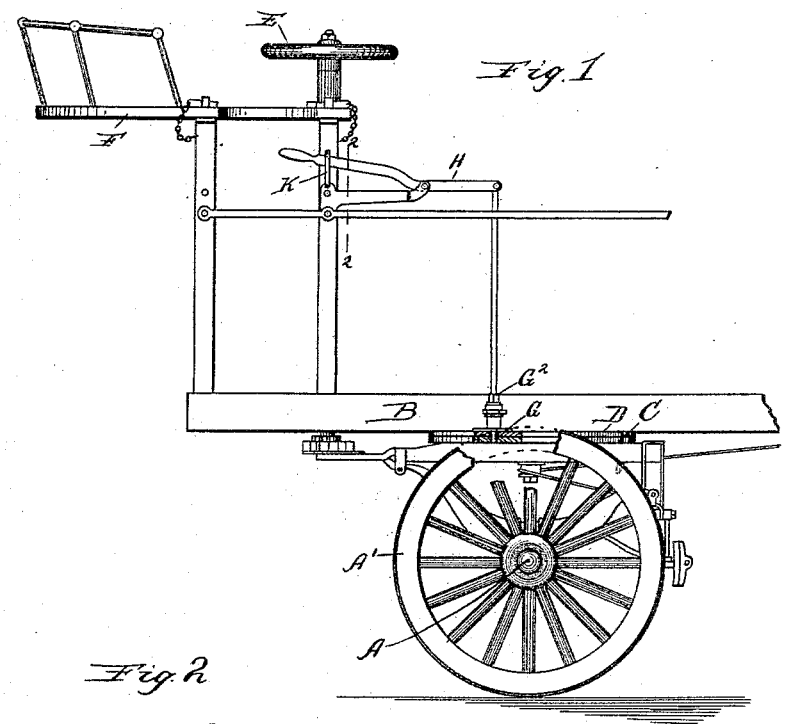
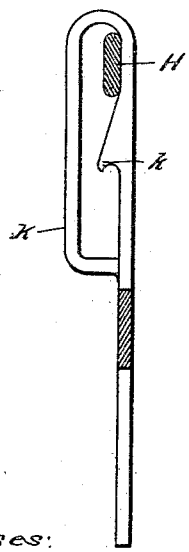
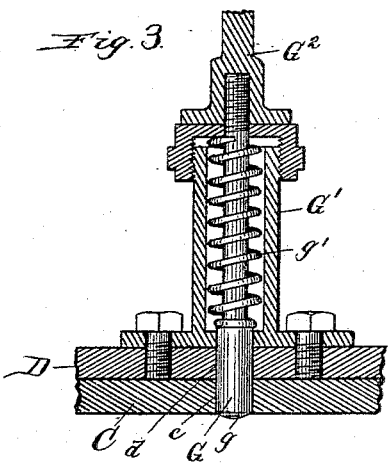
Witnesses:
Geo. C. Curtis
Emma Hack
Inventor:
Everett B. Preston
By Munday, Evarts & Adcock
his Attorneys

UNITED STATES PATENT OFFICE.

EVERETT B. PRESTON, OF CHICAGO, ILLINOIS.

FIRE-LADDER TRUCK.

SPECIFICATION forming part of Letters Patent No. 411,929, dated October 1, 1889.

Application filed July 27, 1889. Serial No. 318,834. (No model.)

*To all whom it may concern:*

Be it known that I, EVERETT B. PRESTON, a citizen of the United States, residing in Chicago, in the county of Cook and State of Illinois, have invented a new and useful Improvement in Fire-Ladder Trucks, of which the following is a specification.

My invention relates to fire-ladder trucks, and more especially to turn-table extension-ladder trucks. In these turn-table extension-ladder trucks the truck-frame at both the front and rear ends is mounted upon fifth-wheels, so that both the front and rear axles can turn in respect to the truck-frame. The fifth-wheel at the rear end of the truck is usually provided with a gearing mechanism, which is operated by a steersman located on a seat at the rear end of the truck-frame. As heretofore constructed it is usually necessary for the steersman to hold the steering-wheel, in order to keep the rear wheels in proper position, as well as to turn the wheels for the purpose of steering or guiding the truck.

The object of my improvement is to provide a simple and efficient device for automatically locking the two rings of the rear fifth-wheel together when the rear wheels are parallel with the truck-frame. To this end I provide the fifth-wheel with a locking-bolt, which passes through suitable openings in the upper and lower rings of the fifth-wheel. This locking-bolt is actuated by a spring, so that when the rear wheels are turned parallel with the truck-frame and the holes or openings in the two rings of the fifth-wheel are brought into register with each other the locking-bolt will automatically engage the two rings and lock them together. The bolt is lifted so as to release or unlock the fifth-wheel by means of a lever, the handle of which projects in convenient position for operation by the steersman.

In the accompanying drawings, which form a part of this specification, and in which similar letters of reference indicate like parts, Figure 1 is a side elevation of a device embodying my invention. Fig. 2 is an enlarged detail view of the lever-guard, and Fig. 3 is an enlarged sectional view of the locking-bolt.

In the drawings, A represents the rear axle of a fire-ladder truck with its wheels A'.

B is the truck-frame.

C is the lower ring of the fifth-wheel, which is connected in the usual manner to the axle, and D is the upper ring of the fifth-wheel, secured rigidly to the frame B.

E represents the steering wheel or mechanism, which may be of any suitable construction now commonly in use and well known to those skilled in the art.

F is the steersman's seat.

G is the locking-bolt by which the two rings C D of the fifth-wheel are rigidly locked together. The lower end of this bolt is made slightly rounded or conical at $g$, so that it will readily enter the hole $c$ in the fifth-wheel ring C when the two rings C D are turned so that the openings $c$ $d$ will be in register with each other.

The locking-bolt G is provided with a spring $g'$, inclosed in a suitable case or shell G'.

The locking-bolt is made in two parts, G and $G^2$, the upper part being connected by screw-threads to the lower part. This is for convenience of construction. The upper end of the locking-bolt G is pivotally connected to an operating-lever H, by which the locking-bolt may be raised, so as to release or unlock the fifth-wheel.

The guard K for the handle end of the lever H is provided with a hook or notch $k$ for holding the locking-bolt in its retracted position. When it is desired to lock the fifth-wheel, all the operator is required to do is simply to release the lever H from the hook $k$, and then when the rear wheels are turned parallel with the truck-frame the spring-actuated locking-bolt G will enter the hole $c$ and lock the two rings of the fifth-wheel rigidly together.

I claim—

1. The combination, in a fire-ladder truck, of the truck-frame with the axle, the fifth-wheel, and a locking-bolt engaging the two rings of the fifth-wheel, substantially as specified.

2. The combination, in a fire-ladder truck, of the truck-frame with the axle, the fifth-wheel, and a locking-bolt engaging the two rings of the fifth-wheel, said locking-bolt being provided with a spring for actuating the same automatically, substantially as specified.

3. The combination, in a fire-truck, of the truck-frame, the axle, the fifth-wheel, a steering mechanism, and a locking-bolt engaging the two wheels of the fifth-wheel for locking the same rigidly together, substantially as specified.

EVERETT B. PRESTON.

Witnesses:
 EDMUND ADCOCK,
 EDW. S. EVARTS.